(12) United States Patent
Milam

(10) Patent No.: US 8,825,547 B2
(45) Date of Patent: Sep. 2, 2014

(54) APPARATUS, METHOD, AND COMPUTER PROGRAM PRODUCT FOR DATA CLEANSING AND/OR BILLER SCRUBBING

(75) Inventor: Amy C. Milam, Wentzville, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 13/605,229

(22) Filed: Sep. 6, 2012

(65) Prior Publication Data

US 2013/0066775 A1    Mar. 14, 2013

Related U.S. Application Data

(60) Provisional application No. 61/531,502, filed on Sep. 6, 2011.

(51) Int. Cl.
- G06Q 40/00 (2012.01)
- G06Q 20/10 (2012.01)

(52) U.S. Cl.
CPC .................... G06Q 20/102 (2013.01)
USPC .......................................... 705/40

(58) Field of Classification Search
CPC ....................................... G06Q 20/14
USPC ....................................... 705/35, 40
See application file for complete search history.

(56) References Cited

U.S. PATENT DOCUMENTS

| | | | |
|---|---|---|---|
| 5,699,528 A | 12/1997 | Hogan | |
| 6,173,272 B1 * | 1/2001 | Thomas et al. | 705/42 |
| 6,418,436 B1 * | 7/2002 | Degen et al. | 1/1 |
| 6,671,813 B2 | 12/2003 | Ananda | |
| 7,814,017 B2 * | 10/2010 | Vancini et al. | 705/42 |
| 7,899,722 B1 * | 3/2011 | Lawrence et al. | 705/35 |
| 7,917,435 B2 | 3/2011 | Hall | |
| 2001/0047335 A1 | 11/2001 | Arndt | |
| 2002/0077972 A1 * | 6/2002 | Wilwerding et al. | 705/39 |
| 2004/0225543 A1 * | 11/2004 | Kapochunas et al. | 705/7 |
| 2009/0012896 A1 | 1/2009 | Arnold | |
| 2009/0112727 A1 | 4/2009 | Chi | |
| 2010/0174644 A1 | 7/2010 | Rosano | |
| 2011/0022481 A1 | 1/2011 | Horvath | |
| 2011/0029405 A1 | 2/2011 | Cronin | |
| 2011/0213707 A1 * | 9/2011 | Jackson et al. | 705/44 |
| 2012/0197788 A1 | 8/2012 | Sanghvi | |
| 2012/0215668 A1 * | 8/2012 | Krakowiecki et al. | 705/30 |

OTHER PUBLICATIONS

"MasterCard RPPS Electronic Payments Maximizer", EPM-PB-O-4/08, 2008 MasterCard. <http://www.rpps.com/PDF/MasterCard%20RPPS%20Electronic%20Payments%20Maximizer%20Product%20Brief.pdf> archived Apr. 10, 2008 by Internet Archive Wayback Machine <http://www.archive.org>.*
"MasterCard RPPS Electronic Payments Maximizer",EPM-PB-O-4/08, © 2008 MasterCard. Downloaded from http://www.rpps.com/PDF/MasterCard%20RPPS%20Electronic%20Payments%20Maximizer%20Product%20Brief.pdf on Oct. 7, 2013.
R.E. Peters, "What is Mastercard RPPS?" downloaded from http://www.ehow.com/facts_5041030_mastercard-mps.html on Sep. 2, 2011.

* cited by examiner

*Primary Examiner* — Eric T Wong
(74) *Attorney, Agent, or Firm* — Otterstedt, Ellenbogen & Kammer, LLP

(57) ABSTRACT

A dropped payment file is obtained at a computing device of an operator of an electronic funds transfer bill payment system from a client of such system. The dropped payment file includes data associated with at least one unsuccessful attempt to match payment data to a corresponding biller. The data in the dropped payment file is cleaned to create an updated dropped payment file. Matching logic is applied to the updated dropped payment file to identify at least one recommended biller to which the payment data should likely have been routed to. The client is advised of the at least one recommended biller.

17 Claims, 4 Drawing Sheets

APPARATUS, METHOD, AND COMPUTER PROGRAM PRODUCT FOR DATA CLEANSING AND/OR BILLER SCRUBBING

CROSS-REFERENCE TO RELATED APPLICATIONS

This patent application claims the benefit of U.S. Provisional Patent Application Ser. No. 61/531,502 filed on Sep. 6, 2011, and entitled "APPARATUS, METHOD, AND COMPUTER PROGRAM PRODUCT FOR DATA CLEANSING AND/OR BILLER SCRUBBING." The disclosure of the aforementioned Provisional Patent Application Ser. No. 61/531,502, including all four appendices thereof, is expressly incorporated herein by reference in its entirety for all purposes.

FIELD OF THE INVENTION

The present invention relates generally to the electronic and computer arts, and, more particularly, to electronic payment techniques.

BACKGROUND OF THE INVENTION

U.S. Pat. No. 5,699,528 to Hogan (expressly incorporated herein by reference in its entirety for all purposes) discloses a system and method for bill delivery and payment over a communications network. In a bill delivery and payment system, users are able to access a server computer on a communications network to obtain bill information and pay bills. For example, such a communications network may be the Internet or the World Wide Web thereof. Using a personal computer, a user can access a Web site provided by the server computer to view the bill information and instruct the server computer as to the details of the bill payment. In a second embodiment, without visiting the web site, users are provided with electronic bills containing bill information in the form of electronic mail (e-mail) at their e-mail addresses. After opening an electronic bill, a user can make the bill payment by replying to the electronic bill.

SUMMARY OF THE INVENTION

Principles of the present invention provide techniques for facilitating data cleansing and/or biller scrubbing. At least some aspects of the techniques may be facilitated by the operator of a payment network or other service provider.

In one aspect, an exemplary method includes the step of obtaining, at a computing device of an operator of an electronic funds transfer bill payment system, from a client of such system, a dropped payment file. The dropped payment file includes data associated with at least one unsuccessful attempt to match payment data to a corresponding biller. A further step includes cleaning the data in the dropped payment file to create an updated dropped payment file. A still further step includes applying matching logic to the updated dropped payment file to identify at least one recommended biller to which the payment data should likely have been routed to. An even further step includes advising the client of the at least one recommended biller.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects, including:

- move payments currently being made with paper checks to electronic payments to enhance speed, security, and/or reduce pollution;
- help existing customers (originators) to improve and/or automate existing logic for locating correct biller (many biller profiles may be present in the system for an existing biller);
- help new customers (originators) develop logic for locating correct biller.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Inventive techniques can be employed in a number of different environments. In one or more embodiments, inventive techniques can be employed in connection with the MASTERCARD RPPS® electronic payment system of Master- Card International Incorporated of Purchase, N.Y., USA. This example is non-limiting; for example, other types of electronic bill payment systems could be employed in other instances. One non-limiting example is described in United States Patent Publication No. 2012-0197788 A1 (expressly incorporated herein by reference in its entirety for all purposes). For the avoidance of doubt, references to MasterCard, unless expressly stated to be limited to MasterCard, are intended to be exemplary of an operator of an electronic bill payment system and/or an operator of a payment network, whether or not qualified by words such as "or other operator."

Figure 1:
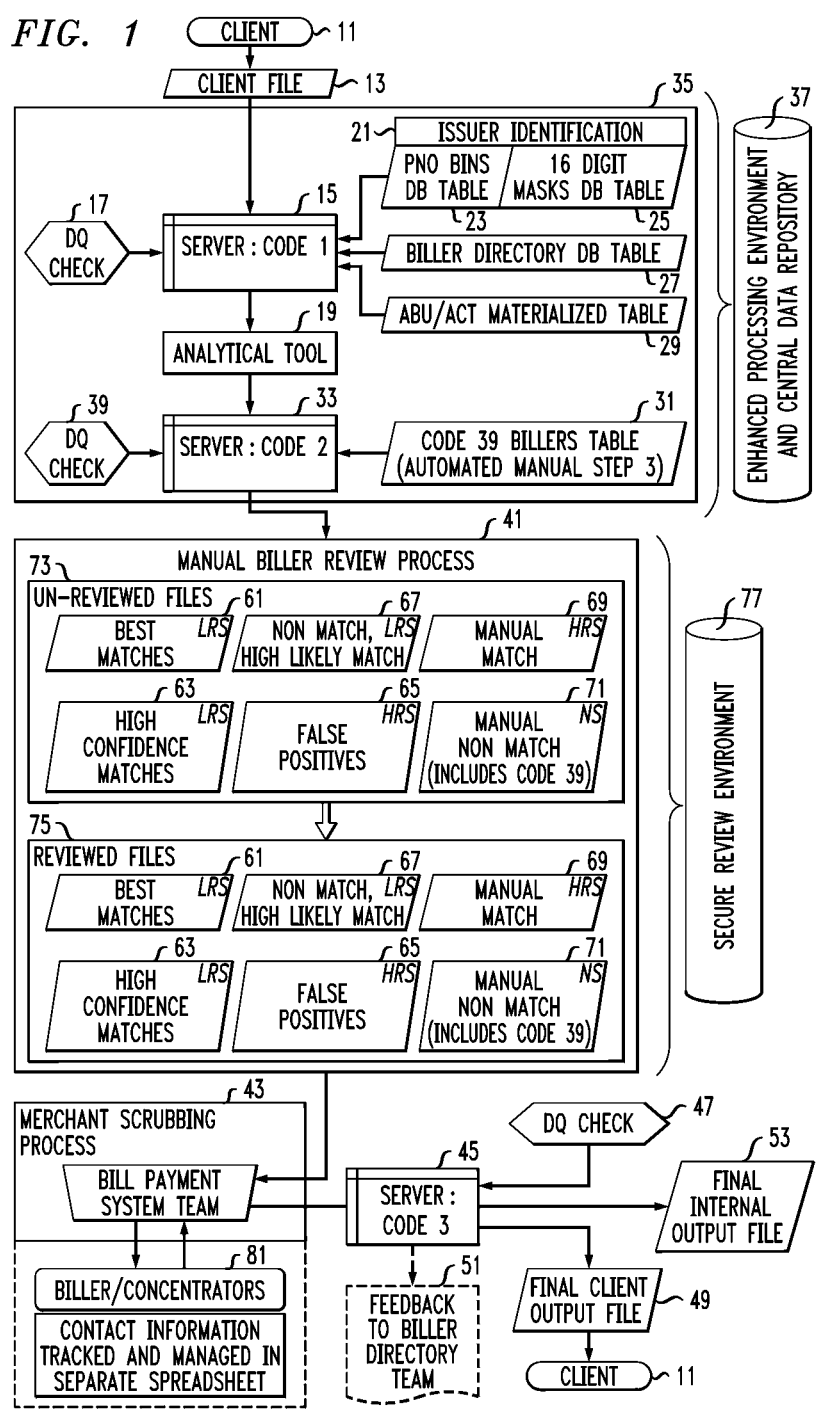
FIG. 1 shows a combined flow chart and block diagram, according to an aspect of the invention.

Referring now to FIG. 1, one or more embodiments "clean" account numbers in an effort to increase the amount of electronic transactions for originators who have payments they desire to route through a payment network, but who are currently experiencing difficulty in doing so, as to at least some accounts. Currently, in cases of difficulty, such payments are instead made by paper checks. Many billers prefer to receive payment by electronic funds transfer (EFT) rather than by paper checks.

Note that some steps, processes, or elements may be indicated as mandatory in the exemplary embodiments of FIG. 1, using words such as must, shall, etc. However, these steps, processes, or elements may be optional in other embodiments and are not intended to limit the claims unless expressly recited therein.

In one step, client 11 (an EFT originator) identifies one or more payments that are currently dropping to paper checks (for the avoidance of doubt, the skilled artisan will be able to tell from the context whether the term "client" refers to an entity such as shown at 11 or to a client in the computing sense (client-server architecture); the client 11 may of course have one or more computing devices that function in a client role within a client-server architecture). Client 11 prepares a client file 13 showing what one or more consumers have entered in an attempt to make an EFT which has failed. File 13 may include, for example:

all payments for which EFT is not successful, and which are thus dropping to paper checks;

for each payment, biller information as entered by consumer, e.g., name, address, city, state;

for each payment, consumer information, e.g., name, address, city, state, zip, telephone, e-mail, consumer's account number with the biller for which he or she is attempting to make payment.

In a non-limiting example, one step includes initial input of client data, as at 11, 13. The client 11 should provide the bill payment system (MasterCard RPPS is, as noted, a non-limiting example) team with a text file 13 containing the following data. For the avoidance of doubt, references to RPPS, unless expressly stated to be limited to RPPS, are intended to be exemplary of an electronic bill payment system, whether or not qualified by words such as "or other bill payment system." There may be two classes of data accepted, for example. If the client wishes a full processing to include verification through billers available to the bill payment system (a final level match) the items in italics should be included. It may be possible to provide verification through billers without all of this information but some billers may require it. If the client wishes to receive only a 'first level' match (probably without the additional step of submitting selected records to the billers for verification) then only the non-italicized items need be included.

| Variable | Variable type | Variable size |
|---|---|---|
| Customer_number (a unique number provided by client) | Character | 15 |
| *Customer_type* | *Character* | *1* |
| *Business_name* | *Character* | *40* |
| *Customer_last_name* | *Character* | *32* |
| *Customer_first_name* | *Character* | *32* |
| *Customer_mid_name* | *Character* | *32* |
| Customer_address1 | Character | 40 |
| Customer_address2 | Character | 40 |
| Customer_city | Character | 32 |
| Customer_state (std USPS abbreviation) | Character | 2 |
| Customer_postal_code (no dashes) | Character | 9 |
| Customer_country (std ISO 3 char abbreviation) | Character | 3 |
| Customer_day_phone | Character | 32 |
| Customer_evening_phone | Character | 32 |
| *Payee_nick_name* | *Character* | *30* |
| Payee_name | Character | 40 |
| Payee_address1 | Character | 32 |
| Payee_address2 | Character | 32 |
| Payee_city | Character | 32 |
| Payee_state (std USPS 2 char abbreviation) | Character | 2 |
| Payee_postal_code (no dashes) | Character | 9 |
| Payee_phone | Character | 32 |
| Payee_account | Character | 32 |

In one or more embodiments, the object of the step associated with 11, 13 includes client set-up. The client 11 may be provided with an approved record layout and a file transmission mechanism, for example. The file 13 is received from the client. In one or more embodiments, a comprehensive record layout is employed to systematically identify the intermediate variables employed for subsequent report generation.

As seen at 15, a server executes a first segment of code ("code 1") to review, standardize, and/or clean up the data. A SAS Server is a non-limiting example of such a server; any suitable hardware server or other data processing hardware, executing any suitable business intelligence software, can be employed. For the avoidance of doubt, references to SAS, unless expressly stated to be limited to SAS, are intended to be exemplary of business intelligence software and/or database software, as the context may indicate, whether or not qualified by words such as "or other system." Exemplary processing can include:

removing any spaces in the account number field;
carrying out a spell check;
rendering data with multiple representations into a common format—e.g., render all variations for post office box as "P.O. Box."

A significant point here is that the failures are likely due to consumers (payers) entering biller data in a manner that does not match the manner in which the biller has entered the data into the database of an electronic bill payment system or the like.

At 17, perform a suitable data quality (DQ) check. For example, check that required fields are present and populated with reasonable values.

Still referring to block 15, cleansing and scrubbing of input data can include any one, some, or all of the following, and/or additional steps in addition to, or in lieu of, these steps:

1. Make copies of original data values (prefix input names with orig_)
2. Create flag to indicate if Payee_account as input contains a dash '-'
3. Convert all double spaces to single spaces
4. Capitalize all values
5. Convert common abbreviations to full name; for example, mc or MC to MASTERCARD; visa to VISA; and/or others. Flags are preferably created to indicate what elements of which records are altered in this step.

6. Assign a sequential value to each record; this can be called, for example, the original_line_number. This ensures a unique identifier for each client record.

7. Standardize Address Information—make the addresses conform to a standard so that matching to the Biller Directory address information is more likely. The addresses in the Biller Directory 27 are preferably submitted to the same standardization process either as they are entered by the biller into the Biller Directory or during extraction but before comparison to the information provided by the client.

With regard to item 7, one non-limiting exemplary option involves use of the Pitney Bowes Geo Code Application available from Pitney Bowes, Inc., Stamford, Conn., USA. This tool is a non-limiting example of a software tool to standardize addresses. The generic function is to better standardize and provide guidelines on how information should be cleansed for best matching purposes. Similar functionality can be provided for data besides addresses. A custom-programmed solution can also be used. Examples of functionality include fixing aberrant spellings of PO BOX, plugging in standard abbreviations such as ST for Street, RD for Road, and the like; due consideration may be given to possible inconsistencies in the way addresses are entered. It is preferred that flags be created to indicate on all records which data elements were altered by the standardization process. The level of detail required can range, for example, from just flagging that a given element was changed to exactly which of several possible changes were made. Retention of the initial values provided by the client for all fields advantageously allows a post hoc in depth detailed analysis if flags alone do not express sufficient detail for later analysis.

For the avoidance of doubt, in one or more non-limiting exemplary embodiments, matching logic can take place in a step carried out by server code 15 and/or in a step carried out by code 19 to be described below and/or in a step carried out by code 33 to be described below.

Element 19 is an analytical tool geared toward advising EFT originators which payments can be made electronically and which must be made by paper check (the tool examines a check file to see if payments earmarked as check payments can instead be converted to electronic payments), by using matching logic applied to client file 13. MasterCard International Incorporated of Purchase, N.Y., USA, is one non-limiting source of such a tool, known as MasterCard RPPS Electronic Payments Maximizer (PAYMAX). For the avoidance of doubt, references to PAYMAX, unless expressly stated to be limited to PAYMAX, are intended to be exemplary of an analytical tool geared toward advising EFT originators which payments can be made electronically and which must be made by paper check, whether or not qualified by words such as "or other system."

Thus, the cleansed data is run through the payment maximizer analytical tool at 19, resulting in a recommended biller to which the payment can be routed.

In a non-limiting example, create an updated file (details of aspects 21, 23, 25, 27, 29 are discussed elsewhere) and send to tool 19 to acquire confirmatory information. For example, in some instances:

1. A pipe ('|') delimited file containing the payee_name, payee_address1, payee_address2, payee_city, payee_state, payee_postal_code, payee_account, original_line_number, and 4 trailing pipes ('||||') should be produced. The first line is a header record, again pipe delimited, containing an issuer id number, date, time, and initials; for example, '00000000|09202010|0800|RB.'

There is also preferably a trailer record containing the same id, date, time, and the number of records; for example, '00000000|09202010|0800|554412.'

2. In the file provided to tool 19, the header and trailing record preferably use the ID '00000000' to allow the file to be processed without producing a billing record and preventing shipment to an outside user of the bill payment application.

3. This file is preferably passed to the a team associated with tool 19 for processing and a return file provided.

4. The return file contains a tab delimited file with the following variables: original_line_number (numeric), paymax_match (char 1 a flag), paymax_biller_id (a Biller ID when identifiable), paymax_error (char 100—error messages about the matching attempt, if there are any), paymax_biller_name (char 100—Biller name when match is successful).

5. This return file is brought back into the job stream at location 33 to be used in assigning the records to 1 of 6 'buckets.'

6. Some embodiments allow dynamic acquisition of the analytical tool information for the payee records, thus reducing the necessity to produce this file and later incorporate the results into the record.

Note the issuer identification at 21. Bill payment systems such as RPPS typically allow payment of any kind of bill such as might ordinarily be received in the mail. This includes, for example, bills associated with credit (or other payment) card accounts. At 23, consult a bank identification number (BIN) table in SAS or other database and/or business intelligence software, such as may be available to an operator of a payment network (e.g., MasterCard International Incorporated of Purchase, N.Y., USA). Note that "DB" is used in FIG. 1 as a generic abbreviation of "database." This table contains a list of valid, active credit (or other payment) card numbers. The BIN, also referred to as "Issuer Identification Number" (IIN), is part of the account number (also known as PAN for primary account number). If the credit (or other payment) card account number is available (for example, in the memo section of the file 13) the intended biller/payment recipient (e.g., issuer) can be identified from the BIN. For the avoidance of doubt, the process just described refers to a consumer attempting to pay his or her credit (or other payment) card bill via paper check or EFT, and not to a payment using a credit (or other payment) card. Note that in many instances, issuers ask for payment to "Cardmember Services" which is, in and of itself, ambiguous; this ambiguity can be resolved via the BIN.

ORACLE and/or DB2 are non-limiting examples of suitable database programs that may be used to implement some elements of one or more embodiments of the invention. For the avoidance of doubt, references to ORACLE and/or DB2, unless expressly stated to be limited to ORACLE and/or DB2, are intended to be exemplary of database software, whether or not qualified by words such as "or other database system." DB2 is a registered mark of International Business Machines Corporation, Armonk, N.Y., USA. ORACLE is a registered mark of Oracle International Corporation Redwood City, Calif., USA.

Note biller directory table 27. The same can be used by originators to locate all billers who are currently set up to receive payments via the bill payment system. Implementation in SAS is a non-limiting example. Each established biller will provide an entity such as MasterCard International Incorporated (or other operator of a payment system and/or payment network) with name, also known as (AKA) names, account structure, remittance addresses on file, and the like. This information can be used in a variety of contexts to determine relationships (e.g., which concentrators are used by a particular biller), as well as during the process carried out by tool 19.

In a non-limiting example, with respect to gathering data from the Biller Directory 27, there are six sets of ORACLE tables used in the matching process; the following items reflect the SQL code to acquire the information.

a) Biller Name Information
```
select a.blr_intrl_id
     ,a.blr_true_id
     ,a.blr_nam as name
     ,a.prev_blr_nam as prev_blr_name
     ,a.assgn_blr_id
     ,a.prvt_blr_sw
     ,a.blr_dircty_type_cd
     ,a.prtcpnt_intrl_id
     ,b.rpps_id
     ,b.nam
from cur_blr a, cur_prtcpnt b
where a.prtcpnt_intrl_id=b.prtcpnt_intrl_id
    and a.lfcycl_stat_type_cd='A'
    and a.blr_dircty_type_cd='RB'
```
b) Biller Address Information
```
select a.cntct_intrl_id
     ,a.data_grp_intrl_id
     ,a.addr_line_1 as a1
     ,a.addr_line_2 as a2
     ,a.city_nam as city_name
     ,a.cntry_sbdvsn_cd
     ,a.post_cd
from cur_cntct a, cur_blr b
where a.data_grp_intrl_id=b.blr_intrl_id
and a.cntct_grp_cd='2'
    and a.lfcycl_stat_type_cd='A'
    and b.lfcycl_stat_type_cd='A'
    and b.blr_dircty_type_cd='RB'
```
c) Biller MaskFormat Information
```
select a.blr_intrl_id
     ,a.mask_frmt
     ,a.mask_intrl_id
from cur_mask a, cur_blr b
where a.blr_intrl_id=b.blr_intrl_id
    and a.lfcycl_stat_type_cd='A'
    and b.lfcycl_stat_type_cd='A'
    and b.blr_dircty_type_cd='RB'
```
d) Biller Mask Descriptions
```
select mask_intrl_id
     ,mask_desc
from cur_mask_desc
where lfcycl_stat_type_cd='A'
```
e) Biller Also Known As (AKA) names
```
select b.blr_intrl_id
     ,a.aka_nam as aka_name
from cur_aka a, cur_blr b
where a.blr_intrl_id=b.blr_intrl_id
    and a.lfcycl_stat_type_cd='A'
    and b.blr_dircty_type_cd='RB'
```
f) Concentrator Contacts Information
```
select a.cntct intrl_id
     ,a.data_grp_intrl_id
     ,a.first_nam
     ,a.lst_nam
     ,c.phn_num
     ,a.email_addr
     ,b.rpps_id
from cur_cntct a, cur_prtcpnt b, cur_phn_num c
where a.data_grp_intrl_id=b.prtcpnt_intrl_id
    and a.cntct_intrl_id=c.cntct_intrl_id
    and a.cntct_grp_cd='3'
    and c.phn_type_cd='P'
    and a.lfcycl_stat_type_cd='A'
    and b.lfcycl_stat_type_cd='A'
```

In one or more embodiments, conduct an initial match (using, e.g., address, name, then account mask 25). In some cases, the scoring sequence for this initial match can be as follows:

a) If street address, state, and zip code all exactly match the address information in the Biller Address file after both have been normalized then a score=70 is assigned.

b) If not all 3 match
  (1) If the street address matches score=50
  (2) If the zip code (9 digit) matches add 20 to score
  (3) If the zip code (9 digit) doesn't match but zip code (5 digit) does, add 10 to the score
  (4) These weights can be reviewed, if desired
  (5) At this point the score may be 70, 50, 60, 20, or 10.

c) If the address score is larger than zero (0) for a given Biller Address then the record continues through the matching process.
  (1) It is possible that a single Payee record may generate more than one record with an address match score greater than 0
  (2) Any 'matching' address from the Biller Directory should be carried along on the records. This will cause the number of records in the file to grow at this point. The original_line_number is pertinent for identifying which records relate to which client supplied records.

d) The Payee Name field is now compared with the Biller Names that are associated with the 'matched' addresses.
  (1) Compare Payee Name with Biller Name element by element. Exclude words that are in list in the following table.

List of words to be excluded when scoring Payee Name and Biller Directory Names for similarity.

| | | | |
|---|---|---|---|
| CITY | LLC | LTD | INC |
| CENTER | CO | CORP | COMPANY |
| CORPORATION | CARD | CARDS | FINANCE |
| SERVICE | SERVICES | MEMBERSHIP | PROCESSING |
| THE | AND | AN | OR |
| OF | FOR | | |

(2) Count the number of words in the Payee Name after excluding the words in above table.
  (3) Count the number of words in Payee Name that are also in Biller Name; position counts—if a word is the 3rd in Payee Name it must also be the 3rd in Biller Name to contribute to the count.
  (4) The Name Score is (number_of_matching_words/total_number_of_words in Payee Name)*30
  (5) This is a non-limiting example.

e) There are several names for each BillerID identified that should be scored.
  (1) The name in the variable in the Biller Name table 'blr_nam'
  (2) The name in the variable in the Biller Name table prev_blr_nam
  (3) Any 'Also Known As' names from the cur_aka table, the records are matched that link to the blr_intrl_id (internal biller id) being carried on the records with adequate address matches. There could be several.

(4) Set a flag to indicate which name (biller name, previous biller name, AKA name) produces the highest name score and keep that score in a variable (name_score). This is done for each internal biller id (biller id is an identifier of a biller) observation—later pick one of the many.

In one or more embodiments, the address_score and name_scores are added together and if the total is 30 or greater the record is allowed to continue to the account mask adding phase of the matching process. Note that in at least some instances, at this point, there may still be more observations than the entered number of transactions.

In one or more embodiments, in the Biller Directory there is a table cur_mask; this table contains a variable mask_frmt that describes the account number for a given blr_intrl_id (internal biller id). There can be both literals and representative characters in a mask. For example if the account number is a 16 character numeric entry with the first 6 characters being the numbers 123456 and subsequent characters being any possible number the mask would be '123456##########.' The possible characters in the mask are, for example:

(1) The length of the payee account must first be the same as the length of the mask. For some types of accounts it is necessary to try to match the payee account with the masks both with dashes and without dashes since some people enter 16 character accounts with dashes every 4 characters (e.g. 1234-1234-1234-1234) and some biller masks may include the dashes and some may not even though they both have 16 character accounts.
(2) A literal Alphabetic or Numeric character, or other character that exactly matches the character in that position in the payee account
(3) #—to indicate that in that position only a number should be present
(4) *—in that position only a alpha character (a-z, A-Z) should be present
(5) @—the character in that position could be either alpha or numeric
(6) !—The character in that position is a Special Character (AKA national character ?-!@#$%^&*( )-_=+~[{]}\|)

In one or more embodiments, at this point, the best result from the matching process is chosen (address score >0, biller name score adds to score >29, there is a mask-account match) and the records are divided into two files—Matched or Non-matched. For the records that get through the Mask adding step, there can still be multiple records for an input record at this point; the record with the highest total score and a mask match is chosen from the candidates. The Matched file will contain the initial data plus biller information. Records that do not have a mask and a total score 30 and above are kept in the Non-Matched group. These 'non-matched' records are passed to the secondary, tertiary, and other matching processes, that are described below. After each matching step, successfully matched records are added to the Matched file. The Non-Match file will revert to contents of initial file as it was after Cleansing and Scrubbing.

In one or more embodiments, conduct secondary matching, focusing on 16 character account numbers, trying to match them to account masks on the basis of the first 6 characters of the account numbers (i.e. masks look like 123456########## or 1234-56##-####-####). This creates two files Matched2, Non-Match. In one or more embodiments, combine Matched and Matched2 files (create flag to note which matching effort resulted in the match) and call the result Matched. Remove data from the Non-Match file that was added during the matching process In one or more embodiments, generate a list of phone numbers paired with their known addresses In one or more embodiments, conduct tertiary matching of entries in the Non-Match file based on pairing the phone number on the initial record with the list generated in the previous step. This creates two files Matched3, Non-Match. Combine Matched and Matched3 files (create flag to note which matching effort resulted in the match) and call the result Matched. Remove data from the Non-Match file that was added during the matching process.

In one or more embodiments, optionally continue the process with other Matching methods as developed. In a non-limiting example, use account number to issuer tables to determine the issuer of accounts not matched by other means and determine possible biller id starting with the issuer information. See location 21 for example.

With respect to ABU/ACT materialized table 29, this refers to the Automatic Billing Updater, a product offered by MasterCard International Incorporated of Purchase, N.Y., USA. See U.S. Pat. No. 7,917,435 (expressly incorporated herein by reference in its entirety for all purposes) and US Patent Publication 2010-0174644 (expressly incorporated herein by reference in its entirety for all purposes). This product includes helpful tables correlating old and new account numbers (e.g., for payment card accounts) when an account restructuring has taken place.

In a non-limiting example, ACT and ABU are DB2 (or other database) tables that provide updates to account numbers. Where there is a match between the table entry and the provided account number, substitute the ACT/ABU value for the provided account number. Preferably, a flag is set to indicate that this change was made and from which table the 'new' account number was acquired. The 'old' account number should be carried along on the record so that if necessary it can be checked later.

With respect to "Code 39" Billers table 31, note that the terminology "Code 39" is simply an arbitrary name for a table that lists certain billers known not to be present in the database. It is known a priori that no match will be found for these billers. Thus, there is no point in wasting further processing time trying to match these billers. Again, SAS is a non-limiting exemplary implementation.

In one or more embodiments, the objective of code segment 15 and its related code segments includes standardization to clean up records, and normalization of records to ensure consistency of nomenclature and initial merchant/biller matching (e.g., name, address, and mask). Functionality of Server code 1, block 15, may, for example, involve suitable translation (e.g., of Perl code or the like) to SAS; incorporation of suitable file clean-up code; incorporation of address standardization and/or zip code clean up; incorporation of normalization protocols; ability to incorporate new business rules such as the development and implementation of new matching rules; and/or capturing of enhancements to matching code (e.g., phone number matching). In one or more instances, a number of metrics are employed to track, for each record, the populated fields; for the populated fields, validity of the entries (such as flagging addresses on file); and tracking of edits made to records.

A number of services and products related to MASTERCARD RPPS can be useful in connection with one or more embodiments of the invention; these include a payment processing and presentment hub; electronic bill payment and presentment (EBPP); Electronic Payments Maximizer (can be sued to implement block 19) which examines a check file to see if payments earmarked as check payments can instead be converted to electronic payments; Account Conversion Technology (ACT) 29 which helps prevent routing issues that stem from incorrect account information (notes payments that require conversion to a new account number, executes the conversion and reroutes the payment); and/or Electronic Exceptions Service (reduces the number of payments that cannot be handled electronically and that instead need to be paid by paper check—exception payments are posted more quickly and the cost of processing exception payments is reduced).

At this point, the initial file has been divided into two files, Matched and Non-Matched. As seen at code segment 33, server code 2, merge in both files with the information from the analytical tool 19. In one or more embodiments, as per 33, a SAS Server executes a second segment of code ("code 2") to merge the results of block 15 with the information from the analytical tool 19. Again, a SAS Server is a non-limiting example; any suitable hardware server or other data processing hardware, executing any suitable business intelligence software, can be employed. Further, blocks 15 and 33 could be different software modules or code segments on the same server or could run on different physical and/or virtual servers. A suitable data quality check is again carried out, as at 39.

In one or more embodiments, an objective of code segment 33 and its related code segments is the combination of the match results from code segment 15 and the analytical tool information, the generation of return codes, and file review prioritization review buckets. Functionality of Server code 2 may, for example, involve identification of prioritized return codes that can be leveraged in future engagements; creation of a SAS or other database code to apply initial return code; identification and capture of intermediate variables that will enable generation of six record designation flags to drive the review process described with respect to block 41 below. These variables are captured, for example, in the record status type designation document. Additional functionality of Server Code 2 may include, for example, determining criteria for establishing high and low risk designations for biller matches and to inform the biller scrubbing process; assigning high and low risk code to biller records to support the biller scrubbing process; as shown at table 31, the ability to load a file that identifies the biller names not currently on the system (as a new file is loaded, the old file is removed); and the generation of one or more quality assurance metrics.

Note that steps and/or elements in box 35 can be implemented, for example, within enhanced processing environment and central data repository 37. In a non-limiting example, implementation could include one or more physicals servers, with access to one or more persistent storage devices, running one or more distinct software modules and/or sub-modules (for example, a database module and a business intelligence software module with sub-modules/code segments to implement the individual blocks and/or steps in box 35).

Attention should now be given to the manual biller review process in box 41, wherein data is segmented by confidence level in its matching ability, taking into account the results of blocks and/or steps 19, 29, for example. The data is segmented in order to assist in determining how to approach it.

Still considering box 41, in one or more embodiments, separate each of the two files into three subsets for a total of 6 groups or buckets:
1. Matched File
  a) Best Matches 61
  b) High Confidence Match 63
  c) False Positives 65
2. Non-Matched File
  a) Non-Match but Highly Likely 67
  b) False Non-Match—Possible Match 69
  c) Non-Match—a solid miss 71

By way of a non-limiting example of additional potential details with respect to the aforementioned six buckets resulting from the initial matching process, in some instances, all records are first 'normalized' which means everything is capitalized; national characters are removed, if there are two blanks next to each other they become one. This happens to all records and is considered basic housekeeping, their application to an individual record is not tracked.

Programmatic editing of the records takes place. Common formatting problems, spelling errors, creation of standard abbreviations (such as rd. for road, st. for street) is applied. These changes are in general tracked at a high level (spelling fixed=1, but not all elements that were fixed).

The incoming records are then submitted to the initial matching process; the results are two high level groups 'MATCHED' and 'NONMATCHED'. Each of these has three sub groups.
  1. Records tagged by the process as 'MATCHED'.
    a. Best Matches 61:
      i. A payee address matches an address in the biller directory (whole or part, street, state, and zip). There are three elements of the address considered in this match process: Street address, State, and zip code. If all 3 elements match a score of 70 is assigned. If all three do not match a score of 50 is given for a Street address match. If the zip+4 code matches a score of 20 is assigned or added to the score. If the zip5 code matches a score of 10 is assigned or added to the score. At this point the total score may be 70, 50, 20, or 10.
      ii. If the address match score is ten or greater, a match (whole or part—based, e.g., on occurrence of same words in names) between the incoming payee name and the biller name from the biller directory is conducted. The name match part of the score is based on the percent of the words in the payee name that matches a word in a biller name. There is a list of 'excluded' words that are not counted during the comparison. The percent is then the number of matched words divided by the number of words in the payee name (less the 'excluded' words) times 30. Thus the maximum score contribution from a name match is 30. The primary biller name from the biller directory as well as the 'previous' biller name and any Also Known As (AKA) names available for the biller entry are scored. The highest scoring name is taken as the name to be used as the 'RPPS biller name' (or other bill payment system biller name) accepted by the process.
      iii. If the combined score of the address score and name score is thirty or greater possible account masks are compared to the payee account number to determine which one most accurately describes the account number. The mask should exactly describe the account number. The first parameter considered is the account number length, then each position in the account number is evaluated as to whether it corresponds to the characteristics in the same position of the mask, possibilities are exact match, only a number, only an alpha, either a number or an alpha, or anything (rare).
      iv. If the record passes all three of the previous steps the biller id record is allocated to the 'Matched' initial group. This initial group has two subgroups broken out of it, described in the following sections (b & c). If the record does not pass all three of the previous three steps the record is allocated to the 'Non-Matched' initial group.
  b. High Confidence Match 63
    i. The incoming address and name have some degree of match but do not result in an account mask being found.
    ii. The submission of the record to analytical tool 19 results in a biller id and no error codes
  c. False Positives 65
    i. Although the 3 initial match steps yielded results the biller id obtained does not match that obtained from analytical tool 19
    ii. The submission to analytical tool 19 results in an Error code.
2. Records tagged by the process as 'Non-Match'
  a. Non-Match but Highly Likely 67
    i. analytical tool 19 returns a biller id
    ii. The incoming payee name and the biller name provided by analytical tool 19 are similar 'close to matching'
  b. False Non-Match—possible match 69
    i. analytical tool 19 returns a biller id
    ii. Incoming payee name does not exactly match the analytical tool 19 Biller name but there is some similarity
    iii. Flag these for research
  c. Non-Match—a solid miss 71
    i. Basically if the record does not fall into the other 5 categories then it is here
    ii. These would be candidates for successive matching attempts
      1. Start with zip code then look for a mask
      2. Mask to account number mast for 16 digit account numbers using the first 6 digits of the account number to try to match the mask that would look like 123456##########
      3. If there is a payee phone number provided, consider trying to match that with biller phone numbers that the address and biller id/name are known for.

In one or more embodiments, acquire list of 'Billers we do not have'—for example, Score Non-Matched records for their similarity with the names of these billers; and Flag observations in the Matched file where biller information is possibly of billers that RPPS or other bill payment system does not have a working relationship with. In some cases, a cut off has not been determined, but once it is, those records that have a score higher than the cutoff indicating that they are very similar to the 'billers we do not have' entry can be moved to the Non-match bucket. A visual inspection should still be done to verify the action in the observation flagging step.

In one or more embodiments, these six groups of records 61, 63, 65, 67, 69, 71 are made available in, for example, a Citrix environment where the bill payment system team may manually review them. It is expected that the emphasis will be on 'Non-matched' records. This manual review is shown as un-reviewed files 73 processing to reviewed files 75. This Citrix environment is a non-limiting example of a secure review environment 77 and, if desired, can also be used for process 43 as discussed below. For the avoidance of doubt, references to Citrix, unless expressly stated to be limited to Citrix, are intended to be exemplary of secure environment, whether or not qualified by words such as "or other environment."

In one or more embodiments, the objective of the steps in box 41 include the bill payment system team executing manual review of records to improve overall match rate. As noted, these steps can be carried out in a suitable secure review environment 77, such as a Citrix environment. These processes include generation of the six files by record designation types; Manual review of outputted files within the confines of the Citrix environment; and enabling the application of new or innovative ad hoc approaches and/or processes that can be applied to the non-matched billers to successively reduce the number of non-matched billers. For example, this could include the use of reverse look ups and phone numbers to achieve matches. In one or more embodiments, generate new files for the scrub process that reflect updates from the manual scrub process.

Refer to merchant scrubbing process 43. A typical network may include, for example, hundreds of originators and thousands of billers. In some instances, customers reach out directly to the appropriate contacts at billers to facilitate making payment electronically rather than by paper check; for example, customers may send a file such as 13 directly to the biller to request assistance in formatting it correctly such that intended electronic payments do not drop to paper. Here, at 43, the operator of the payment system acts as a central clearinghouse to facilitate the processes in an automated fashion, and the results of the process are used to update the databases of the bill payment system.

In one or more embodiments, in process 43, create files to be submitted to Billers and Concentrators 81 for their analysis. Suitable security checking is recommended so as to be sure to send billers only their own accounts. Different Billers will require different styles and contents in input data. In some instances, an appropriate environment is implemented to allow multiple bill payment system staff members to review records and prepare files for billers.

In one or more embodiments, utilize results of manually analysis of records resulting from the matching process. For example, focus in some instances is preferably on False Positives, Non-Match but Highly Likely and False Non-Match—Possible match categories. The goal of the manual analysis is to try to have people look for things that the coded process does not fix. The decisions from the manual review will be the basis for improving the matching process as well as producing final matching. Biller Directory Feedback 51 is intended to improve the quality of the data in the Biller Directory 27. Information obtained during the manual analysis process should also preferably be used to improve the 'automatic' matching process conducted with code segments 15 and 33; for example, update via file 53.

It should be noted that as the manual review process is conducted, the assignment of files to the six categories 61, 63, 65, 67, 69, 71 may change; that is, for example, a file which is non-matched prior to review may be matched and moved to a different category after the manual review process.

With respect to process 43, Scrubbing is the process of biller/consolidator review of matched records. The goal is for the biller/consolidator to confirm the account and confirm that the bill payment system profile reflects the most current information.

Exemplary requirements include:
(1) Automated creation of biller scrub files leveraging the biller id. This aspect may be driven, for example, off a two-part logic tree: a) does concentrator want to opt into the biller scrub process and b) if yes, does concentrator want record sent to concentrator or to the biller.

(2) Enable processing of test files.

(3) Requirements for biller scrub file build, which in turn may include:
- a) A simple standardized spreadsheet that can be sent to all billers and/or consolidators containing only relevant records as identified above;
- b) Lock down of the payment network operator-supplied data populating the file to be provided externally (payment network operator is abbreviated PNO and MasterCard International Incorporated is one non-limiting example);
- c) within the file fields must be provided to make changes or corrections to the supplied elements;
- d) file should support the standardization of corrections and updates;
- e) quality assurance process is preferred to ensure file integrity upon return to PNO by biller and/or consolidator
- f) file structure should enable the application of updates as described elsewhere herein to support their incorporation into internal and external files 53, 49.

(4) Automated and secure process to schedule and automate the provision of scrub files to concentrators and billers; in addition, preferably establish a manual process in those cases where agreements may not be in place that allow for information sharing with billers.

(5) Receive scrub file back from billers and concentrators and validate quality of the files received.

In one or more embodiments, methods, apparatuses, and/or computer program products include steps/elements/modules in box 35 per se implemented, for example, in environment 37, alone or in conjunction with steps/elements/modules in boxes 41 and/or 43 implemented, for example, in environment 77, and/or steps/elements/modules 45, 47, 49, 51, 53 implemented, for example, in environment 37 or the like.

After process 43, all the data has been assembled and recommendations are ready; now, with server code segment 45, the data and recommendations are made available to the appropriate concentrator(s) and/or receiver(s), in the form of scrubbed files that can be validated in the systems of the appropriate concentrator(s) and/or receiver(s). The operator of the payment system (for example, a PNO, but in other embodiments, may offer only EFT payment system services and not operate a payment card network) in effect acts as a centralized hub, pushing the data and recommendations out to the applicable parties and having them validate and/or correct anything that is wrong. Again, a suitable data quality check is made at 47; and again, code segment 45 can involve a SAS Server executing a third segment of code ("code 3")—a SAS Server is a non-limiting example; any suitable hardware server or other data processing hardware, executing any suitable business intelligence software, can be employed. Further, as described with respect to blocks 15 and 33, blocks 15, 33, and 45 could be different software modules or code segments on the same server or could run on different physical and/or virtual servers.

The appropriate concentrator(s) and/or receiver(s) send the corrected files back to the operator of the payment system, who in turn updates the processing environment and/or central data repository 37, with suitable flags for payment data where one or more of the following occurred:
"massaging" of data
account conversion/ABU identified corrected account number
biller provided corrected information These and other updates are joined together in a suitable file structure 49, which is pushed out to the client 11 for use in making appropriate updates. Furthermore, the operator of the payment system (for example, the operator of a payment network such as MasterCard International Incorporated of Purchase, N.Y., USA) provides appropriate feedback (e.g., updated remittance addresses) to a team charged with maintaining biller directory 27, as at 51, and prepares an internal output file 53 to automatically update missing information, provide metrics and/or reporting, and the like.

In some instances, with regard to Internal Reporting 53, when the manual process is complete the combined file (matched and non-matched records) should be summarized. The exact contents of this summary may include, for example:
- a) Summaries of how closely the client input records conformed to the required input specifications.
- b) Summaries of the flags set during the cleansing process to give some indication as to what fields require the most amount of cleaning up
- c) Summaries of how many records were matched and remain unmatched at each step in the matching process
- d) Summaries of how many of the 'Matched' records were finally accepted by the billers/concentrators as being eligible for electronic processing.
- e) Comparison of expectations for matching submitted records with final outcomes.

In some instances, with regard to Client Reporting 49, the client reports are oriented towards the matching success rates and may need to be customized to respond to a given client's feedback requests. There is preferably a basic standard report that includes the items following and anything in addition to this can be provided where appropriate:

1. Basic reports on how many records of those submitted were finally accepted by the billers/concentrators for electronic processing.
2. The basic reports should include the entries as received from the client, the cleansed addresses and the like, and the biller information resulting from the matching.
3. Of those finally accepted what were the 'automatic' adjustments to the input records that were necessary.
4. How many of the records were accepted only after manual inspections and what type of input record issues were uncovered—that is, how could the client improve its input records to increase the usefulness of the automatic processes?
5. A high level summary of what fields needed correction other than the basic space removal, capitalization, national character removal that preceded the more intense record standardization.

In at least some instances, an object of step(s) carried out with code segment 45 and related code segment(s) is the incorporation of all edits for generation of a final output file, including DQ checks 47. Exemplary requirements include (these are non-limiting examples; any one, some, or all could be included in a particular embodiment; furthermore, other requirement(s) could be included in addition to or in lieu of these):

1) Identify relevant DQ metrics: this will focus on capturing updates to files made by billers and concentrators;
2) Incorporate biller transformation rules for non-matched records;
3) Create two files: a) Internal Output file containing all columns added to initial file as it has moved through process; b) External file containing a subset of elements from the Internal file, as specified by the client, to be shared with the client;
4) Create simple user friendly front end so that the bill payment system can leverage and run in the future;

5) Determine how one or more teams (e.g., an analytical team) associated with the bill payment system will see the data in order to work it when necessary. This can include, for example, capability to push out the files to an Excel spreadsheet or the like to be worked (EXCEL is a registered mark of Microsoft Corporation, Redmond, Wash., USA—For the avoidance of doubt, references to EXCEL, unless expressly stated to be limited to EXCEL, are intended to be exemplary of a spreadsheet program, whether or not qualified by words such as "or other spreadsheet.").
6) One record out for each that came into account for all records. Ensure that all records have a return code. If record is flagged as matched, identify that there is a biller id.
7) Ensure that process generating biller match (e.g., pass/fail methodology) is captured;
8) Ensure all process performance statistics can be generated, leveraging inputs from prior processing steps;
9) Generate insights about the number of payments associated with billers not accepting electronic payments, to develop business case with consolidators for action;
10) Share updates with biller directory team to update biller directory;
11) Leverage insights from manual review process to identify opportunities to the match process;
12) Identify what processes can be automated through business intelligence and/or database software and the like In at least some instances, an object of preparing file 49 and related steps is the design of a suitable, and preferably ideal, process for sharing information with the client. Exemplary requirements include:
1) Phased delivery of completed work to client to ensure a manageable process;
2) Identify elements for inclusion in external file 49;
3) Provide flexibility in sharing information with client (e.g., "one shot" and batches);
4) Chunking out enables client to develop a strategy for maximizing electronic lift in a manner that minimizes the consumers' negative experience;
5) Provide for flexibility in generation of client output file 49.

Figure 2:
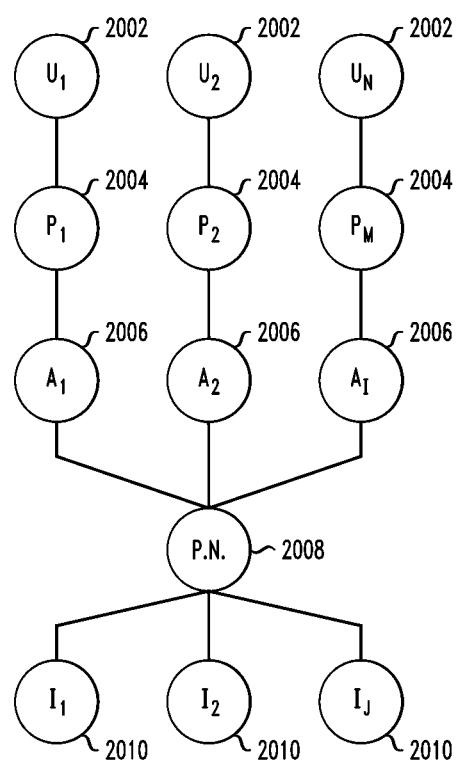
FIG. 2 depicts an exemplary inter-relationship between and among: (i) a payment network configured to facilitate transactions between multiple issuers and multiple acquirers, (ii) a plurality of users (e.g., consumers or payers), (iii) a plurality of merchants, (iv) a plurality of acquirers, and (v) a plurality of issuers.

With reference to FIG. 2, an exemplary relationship among multiple entities is depicted in the context of a card payment process. For the avoidance of doubt, one or more embodiments are directed to payments via EFT; however, in one or more embodiments, the operator of a payment network may operate a network which is capable of facilitating the kinds of transactions discussed with respect to FIG. 2 and may also operate a system as shown in FIG. 1. A number of different users 2002, $U_1, U_2 \ldots U_N$, interact with a number of different merchants 2004, $P_1, P_2 \ldots P_M$. Users 2002 could be, for example, consumers, payers, or other holders of payment cards. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network (PNO) configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. The payment network typically includes a virtual private network (VPN) such as the aforementioned BANKNET® network.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the invention may be employed with other kinds of payment networks, for example, proprietary or closed payments networks with only a single issuer and acquirer.

It should be appreciated that one or more embodiments are directed to payments by electronic funds transfer rather than credit or other payment card. However, one or more embodiments are implemented in connection with an electronic bill payment system such as RPPS. In a preferred but non-limiting embodiment, the operator of such electronic bill payment system is also the operator of a payment network such as that shown in FIG. 2, or of a payment network configured to facilitate transactions between multiple issuers and a single acquirer.

Figure 3:
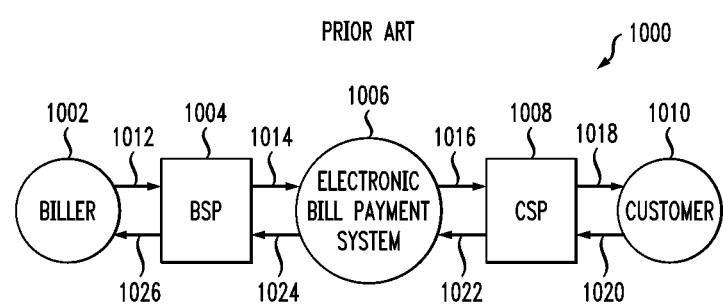
FIG. 3 shows exemplary operation of a current bill pay system.

FIG. 3 shows operation of a current electronic bill payment system, such as the MASTERCARD RPPS® electronic payment system, which is but one non-limiting example of such a system. Given the teachings herein, the skilled artisan will be able to implement one or more embodiments of the invention using a variety of techniques; by way of example and not limitation, the modification or supplementing of an existing system such as that shown in FIG. 3 using techniques described herein. As shown in FIG. 3, in a current approach 1000, during a presentment phase, a biller 1002 electronically sends billing information 1012 to its biller service provider (BSP) 1004, that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Figure 4:
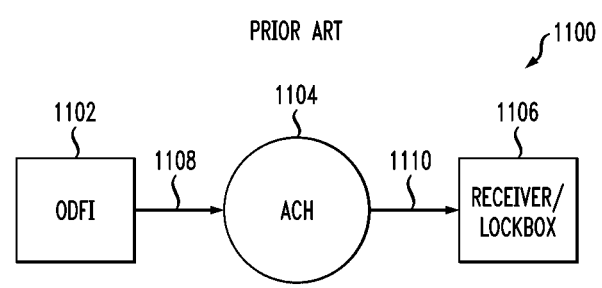
FIG. 4 shows exemplary operation of current automated clearinghouse payments.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; one non-limiting example of an ACH file format is the NACHA ACH CCD file format. Other formats can also be used; for example, extensible markup language (XML). It should be noted that a variety of networks can be used, both public (for example, ACH) and proprietary (for example, the aforementioned MASTERCARD RPPS system).

One or more embodiments thus enhance, or even optimize the rate of electronic bill payment by providing a new computer program product, method, system and/or apparatus that will:

- Normalize an originator's bill payment file standardizing fields that will result in better match rate to billers on the RPPS Directory (or other bill payment system directory) allowing MasterCard or another entity that operates a bill payment system to provide recommendations on how to improve electronic match rate
- Run cleansed data through multiple match engines, one being tool 19—to obtain results that can be analyzed and scored to determine confidence level of match rate. Some embodiments may incorporate additional layers of ad-hoc matching logic based upon information learned
- Leverage existing functionality such as Account Conversion Technology, Automated Biller Updater to determine if biller/issuer has provided corrected account information
- Provide an automated batch file process that facilitates scrub files between Originators, RPPS or other bill payment system, and Receivers/Billers
- Provide consulting services using analysis of each modularized component and reporting
- Identify gaps in the RPPS Biller Directory (or other bill payment system biller directory) that once addressed will optimize electronic bill payments for all participants This will advantageously permit incorporating existing products such as stop file or enable future products such as positive file and a biller scrub solution offered by an operator of a bill payment system:

- Incorporating stop file value add
- Incorporating electronic exception payments value add
- Allowing receivers/billers to provide a positive file that identifies current active account. This data could be used in the biller validation
- Enable a stand alone biller scrub file product offering Given the discussion thus far, it will be appreciated, in general terms, an exemplary method, according to one aspect of the invention, includes the step of obtaining, at a computing device (e.g., a physical server running code 15) of an operator of an electronic funds transfer bill payment system, from a client 11 of such system, a dropped payment file 13. The dropped payment file includes data associated with at least one unsuccessful attempt to match payment data to a corresponding biller. A further step includes cleaning the data in the dropped payment file to create an updated dropped payment file. These steps can be carried out by a suitable data cleaning module (e.g., code segment 15 executing on the computing device). A still further step includes applying matching logic to the updated dropped payment file to identify at least one recommended biller to which the payment data should likely have been routed to. This step can be carried out by a suitable matching logic module (e.g., code segment 19 executing on the computing device, with optional merging functionality of code segment 33 executing on the computing device, as described above). An even further step includes advising the client 11 of the at least one recommended biller; for example, by having a suitable output module, such as code segment 45, executing on the computing device, prepare and send the file 49.

In some instances, in the obtaining step, the unsuccessful attempt is an unsuccessful attempt to make an electronic funds transfer bill payment with the system; and, in the applying step, the matching logic identifies the at least one recommended biller as a destination that the at least one unsuccessful attempt should likely have been routed to. That is to say, in general, the dropped payment file may relate to failures to locate a biller a priori (prior to attempting payment) and/or to actual attempts to make payment that fail.

In some cases, the at least one unsuccessful attempt includes an attempt to settle a payment card account via an electronic funds transfer, and includes an account number associated with the payment card account. For the avoidance of doubt, as discussed above, this refers to an attempt by the cardholder to use EFT (and not a payment card payment) to pay the issuer of a payment card; for example, John Smith seeks to pay Acme Bank, the Issuer of his MasterCard, via an EFT from his checking account, for the amount of his July 2012 charges. Also, a payment card account can include, for example, a credit card account or a debit card account (one or more embodiments are also applicable to the addition of value to a stored value card via EFT). In such cases, as described with respect to process 21, the applying of the matching logic includes identifying an issuer of the payment card account from a BIN portion of the account number. This step can be carried out by code segment 19 executing on the computing device, and accessing the data structures 21, 23, 25, for example. Furthermore in this regard, one or more embodiments are believed to be particularly advantageous in cases when the cardholder "pushes" the payment from his or her checking account, as opposed to cases where the bank "pulls" the funds from the cardholder's checking account (although other embodiments could use a "pull" model). This is because, in the "push" case, the biller does not have the information that the biller would have in the "pull" case.

In some instances, the applying of the matching logic includes comparing the updated dropped payment file to a biller directory 27 of billers who are set up to receive payments via the system. This step can be carried out by code segment 19 executing on the computing device, and accessing the data structure 27, for example.

It should be noted that the computing device can be realized as one or more processors on a single computing device, or multiple interconnected computing devices each with one or more processors.

In some cases, the comparing includes carrying out an initial match to assign a score to the at least one recommended biller; and determining that the score falls into a first predetermined range of values. Note that the terms "first," "second," and "third" are used herein, including the claims, to refer to logically distinct ranges of values. In some claims, the term "second" may be used without there being reference to a "first" predetermined range of values; this is not meant to imply that there is necessarily more than one predetermined range of values with regard to such claim, but only to avoid semantic confusion. Similarly, in some claims, the term "third" may be used without there being reference to a "first" and/or "second" predetermined range of values; this is not meant to imply that there is necessarily more than one predetermined range of values with regard to such claim, but only to avoid semantic confusion.

The first predetermined range of values could correspond, for example, to a case where the score is high enough that no secondary or tertiary matching is needed—say, a score of at least 30 as described above. In such cases, the advising of the client 11 of the at least one recommended biller is responsive to determining that the score falls into the first predetermined range of values. As described above, in some cases, assigning the score includes assigning an address sub-score address_score and assigning a name sub-score name_score, and combining (e.g., adding) the address sub-score and the name sub-score to obtain the score.

The second predetermined range of values could correspond, for example, to a case where the score is high enough to go forward but not high enough to be sure of a match, such that secondary and possibly tertiary matching is needed, as described above (e.g., score less than 30 but address score is non-zero and not a code 39 situation). In such cases, at least the secondary matching process is carried out in response to the determining that the score falls into the second predetermined range of values. In such cases, the advising of the client 11 of the at least one recommended biller is responsive to a match during the secondary (or higher) matching process.

In some cases, no match can be obtained. For example, the dropped payment file may further include data associated with at least a second unsuccessful attempt to match payment data to a corresponding biller. The matching logic is applied to the updated dropped payment file to attempt to identify at least another recommended biller to which the payment data associated with the at least second unsuccessful attempt should likely have been routed to. The initial match is carried out to assign a score to the at least another recommended biller. However, the score falls into third predetermined range of values (e.g., score of zero or Code 39 situation); in this case, responsive to the score falling into the third predetermined range of values, an indication is made that no match can be found for the at least second unsuccessful attempt.

In another aspect, as described with regard to table 29, in some instances, the applying of the matching logic includes comparing a first account number in the updated dropped payment file to an account restructuring data structure 29; locating a second account number, in the account restructuring data structure, which is associated with the first account number in an account restructuring process; and further applying the matching logic based on the second account number. For example, as described in the aforementioned U.S. Pat. No. 7,917,435, suppose First Bank of Smithtown sells its portfolio to Acme Bank and Baker Bank. Some subset of the old accounts could be assigned to Acme Bank and another set to Baker Bank, based on account numbers or some other criteria. For example, some range of old account numbers could go to a first one of the new accounts (associated with Acme Bank) and another to a second of the new accounts (associated with Baker Bank). The unsuccessful attempt may have been using an old account number (the first account number) associated with First Bank of Smithtown. By translating the first account number into the second account number, associated, say, with Acme Bank or Baker Bank as the case may be, the remainder of the matching process may utilize the second account number to successfully identify the at least one recommended biller as Acme Bank or Baker Bank, whichever is correct.

In some cases, manual review process 41 is employed. In such cases, the applying of the matching logic includes categorizing a putative biller match for the at least one unsuccessful attempt into one of at least two categories to obtain categorized review information, as described with regard to un-reviewed files 73. The categorized review information is made available to at least one human reviewer in a secure review environment 77. Input is obtained from the at least one human reviewer (e.g., resulting in reviewed files 75). In such cases, the at least one recommended biller is based on the applying of the matching logic and the input from the at least one human reviewer. The human reviewer can be, for example, an employee of or contractor to the operator of the bill payment system; or an employee of or contractor to another entity such as a merchant, biller, or the like.

As noted, in some cases, biller directory 27 of billers who are set up to receive payments via the system, is updated based on the input from the at least one human reviewer, as seen at 51 (e.g., code segment 45 running on the computing device may generate a suitable feedback file 51).

As noted, in some cases, the client 11 is advised of the at least one recommended biller by providing a client output file 49 to the client. As described with regard to process 43, in some cases, a further step includes obtaining input from the at least one recommended biller prior to providing the client output file to the client. The input, shown at 81, may be direct from the at least one recommended biller or from an intermediary party such as a concentrator or the like. This step can be carried out, for example, by e-mail file exchange with the party(ies) 81, by providing the party(ies) 81 with a secure link to a file for the party(ies) 81 to comment on (e.g., output file from process 41; comments are incorporated to obtain file 49).

System, Article of Manufacture, Infrastructure And Review Environment Details

One or more embodiments employ Communications and Data Transfer Enhancement, such as:

1) Flexible file transfer mechanism to and from clients, consolidators and billers. Various transmission mechanisms should be supported to meet needs of different constituents in the biller scrub system;

2) Leverage existing systems where possible. Some methods that may be employed are: 1) Secure Web Protocol (FTP, HTTP and HTTPS); and WinZip encrypted file transmission via email;

3) Flexibility in format for file receipt from customers. Preferred file type is Excel, followed by txt/csv;

4) Follow PCI Security Standards Counsel guidelines

5) Automate data transfer as much as possible;

6) Be scalable;

7) Share input and output files with clients;

8) Share validation files with billers and consolidators.

One or more embodiments employ a variety of suitable File Formats, and may include:

1) Creation of a standardized record file layout for files moving through process and corresponding variable names. These variable names can in turn be used for formalized coding of the process and associated metrics;

2) Creation of a standardized file format for information exchange between the bill payment system team and billers/consolidators in step 43 (Scrub Validation).

One or more embodiments employ a variety of suitable tools, and may include a tool to support standardization of addresses on client input files that is consistent with the standardization on the bill payment system Biller directory 27. (Optionally, leverage the tool to create standardization within the bill payment system Biller directory). Refer to the non-limiting example of a Pitney Bowes application discussed elsewhere.

With regard to the enhanced Processing Environment and Central Data Repository 37, the processing environment will preferably have access to (e.g., Oracle) Biller Directory tables 27 and (e.g., DB2) ABU/ACT tables 29; such access may, for example, be read-only. Exemplary steps include setting up a generic password and user id; providing an application that can read DB2 tables (or other database tables as the case may be) and installing same in an appropriate location; updating impacted code; software training; and establishment of required connection(s).

It is believed desirable to enable integration of all necessary sources of data into a single environment that automates the processing steps as much as possible, beginning with file receipt and for multiple clients simultaneously.

One or more embodiments can be architected on a single server (but multi-server or distributed embodiments are also possible). The design of the environment should preferably minimize impact on the production system.

One or more embodiments make suitable use of the analytical tool system 19. One or more embodiments automate the manual receipt of files by integrating Server Code One 15 into the analytical tool batch process, as well as automating the manual process of sending analytical tool files to server code 2 at 33.

Sufficient storage space is preferably provided to support multiple client engagements. It is preferable to determine what data to store and for how long after process completion. It is desirable, in some instances, to determine when and how often to access analytical tool 19 so as not to interfere with the core analytical tool process.

With regard to secure review environment 77, the same preferably provides a flexible and easy to use user front end that is customizable based on data elements received or by specific customers. Some embodiments may be implemented via a separate instance of Citrix for the bill payment system. One or more embodiments preferably provide for encryption and compression (e.g., WinZip encryption in Citrix) to facilitate file review with outside parties. One or more embodiments preferably satisfy Data Usage requirements for review of PCI data. One or more instances preferably facilitate file review by multiple individuals. In at least some cases, a suitable tracking system shows which parties are logged into the environment and running.

At least some instances provide Matching Technique Development and Optimization; for example, 1) Enabling the development and testing of new matching techniques; 2) Enabling the incorporation of new techniques into the matching process; and/or 3) Enabling the testing of matching technique sequencing, in light of new technique incorporation, to optimize process lift.

One exemplary New Technique "A" involves use of a Member Hierarchy table to identify a PAN's issuing bank. Where it is known that the issuing bank deals with billing, there follows a method for obtaining the biller information.

One exemplary New Technique "B" involves use of biller provided phone number(s) to support the match process. In the files of some clients, most records may be populated with the payee phone number. Where there is a phone number and address, leverage this pattern to fill in blanks on address on file.

Embodiments of the invention can employ hardware and/or hardware and software aspects. Software includes but is not limited to firmware, resident software, microcode, etc. Firmware provides a number of basic functions (e.g., display, print, accept keystrokes) that in themselves do not provide the final end-use application, but rather are building blocks; software links the building blocks together to deliver a usable solution.

Figure 5:
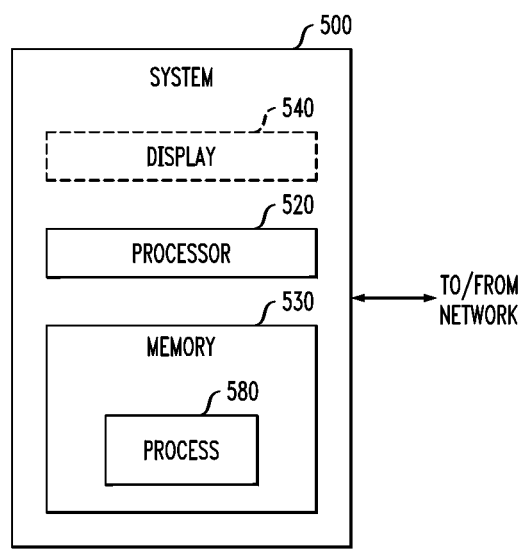
FIG. 5 is a block diagram of an exemplary computer system useful in one or more embodiments of the invention.

FIG. 5 is a block diagram of a system 500 that can implement part or all of one or more aspects or processes of the invention. As shown in FIG. 5, memory 530 configures the processor 520 (which could correspond, e.g., to servers implementing one or more function/environments, or processors associated with any entities as depicted in the figures, and the like) to implement one or more aspects of the methods, steps, and functions disclosed herein (collectively, shown as process 580 in FIG. 5). Different method steps can be performed by different processors. The memory 530 could be distributed or local and the processor 520 could be distributed or singular. The memory 530 could be implemented as an electrical, magnetic or optical memory, or any combination of these or other types of storage devices. It should be noted that if distributed processors are employed, each distributed processor that makes up processor 520 generally contains its own addressable memory space. It should also be noted that some or all of computer system 500 can be incorporated into an application-specific or general-use integrated circuit. For example, one or more method steps could be implemented in hardware in an ASIC rather than using firmware. Display 540 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal. Such a tangible computer-readable recordable storage medium is non-transitory.

The computer systems and servers described herein each contain a memory that will configure associated processors to implement the methods, steps, and functions disclosed herein. Such methods, steps, and functions can be carried out, e.g., by processing capability on the various elements, platforms, and so on, processors associated with any entities as depicted in the figures, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention can make use of computer technology with appropriate instructions to implement method steps described herein.

Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable storage medium. Further, one or more embodiments of the invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 500 as shown in FIG. 5) running a server program. It will be understood that such a physical server may or may not include a display, keyboard, or other input/output components. A "host" includes a physical data processing system (for example, system 500 as shown in FIG. 5) running an appropriate program. Servers or hosts may run business intelligence/analysis software, database software, security software, communications software, or any other suitable type of software mentioned herein.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in FIG. 1 (e.g., databases, user interfaces, business intelligence/analysis, communication, security, and so on). In some instances, the modules include a data cleaning module, a matching logic module, and an output module, as described elsewhere herein. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers or personal computers, located at one or more of the entities in the figures, as well as within the payment network and/or payment system. Such computers can be interconnected, for example, by one or more of payment network 2008, another VPN, the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, and the like (an exemplary and non-limiting list; see discussion of other programs herein), and can also make use of, for example, Extensible Markup Language (XML), known application programs such as relational database applications, spreadsheets, and the like. The computers can be programmed to implement the logic and/or data flow depicted in the figures.

In at least some instances, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, by one or more computers of an electronic funds transfer bill payment system, a dropped payment file from a first client among one or more clients, said dropped payment file including data associated with at least one unsuccessful attempt to match payment data to a corresponding biller;
cleaning, by said one or more computers, said data in said dropped payment file to create an updated dropped payment file;
applying, by said one or more computers, matching logic to said updated dropped payment file to identify at least one recommended biller to which said payment data should likely have been routed to; and
advising, by said one or more computers, at least one of said one or more clients of said at least one recommended biller;
wherein:
in said obtaining step, said unsuccessful attempt comprises an unsuccessful attempt to make an electronic funds transfer bill payment with said system; and
in said applying step, said matching logic identifies said at least one recommended biller as a destination that said at least one unsuccessful attempt should likely have been routed to; and
wherein:
said at least one unsuccessful attempt comprises an attempt to settle a payment card account via an electronic funds transfer, and includes an account number associated with said payment card account; and
said applying of said matching logic comprises identifying an issuer of said payment card account from a BIN portion of said account number.

2. A method comprising the steps of:
obtaining, by one or more computers of an electronic funds transfer bill payment system, a dropped payment file from a first client among one or more clients, said dropped payment file including data associated with at least one unsuccessful attempt to match payment data to a corresponding biller;
cleaning, by said one or more computers, said data in said dropped payment file to create an updated dropped payment file;
applying, by said one or more computers, matching logic to said updated dropped payment file to identify at least one recommended biller to which said payment data should likely have been routed to; and advising, by said one or more computers, at least one of said one or more clients of said at least one recommended biller;

wherein:

in said obtaining step, said unsuccessful attempt comprises an unsuccessful attempt to make an electronic funds transfer bill payment with said system; and in said applying step, said matching logic identifies said at least one recommended biller as a destination that said at least one unsuccessful attempt should likely have been routed to;

wherein said applying of said matching logic comprises comparing said updated dropped payment file to a biller directory of billers who are set up to receive payments via said system; and wherein said comparing comprises:

carrying out an initial match to assign a score to said at least one recommended biller; and determining that said score falls into a predetermined range of values;

wherein said advising said at least one of said one or more clients of said at least one recommended biller is responsive to determining that said score falls into said predetermined range of values.

3. The method of claim 2, wherein assigning said score comprises:

assigning an address sub-score;

assigning a name sub-score; and combining said address sub-score and said name sub-score to obtain said score.

4. A method comprising the steps of:

obtaining, by one or more computers of an electronic funds transfer bill payment system, a dropped payment file from a first client among one or more clients, said dropped payment file including data associated with at least one unsuccessful attempt to match payment data to a corresponding biller;

cleaning, by said one or more computers, said data in said dropped payment file to create an updated dropped payment file;

applying, by said one or more computers, matching logic to said updated dropped payment file to identify at least one recommended biller to which said payment data should likely have been routed to; and advising, by said one or more computers, at least one of said one or more clients of said at least one recommended biller;

wherein:

in said obtaining step, said unsuccessful attempt comprises an unsuccessful attempt to make an electronic funds transfer bill payment with said system; and in said applying step, said matching logic identifies said at least one recommended biller as a destination that said at least one unsuccessful attempt should likely have been routed to;

wherein said applying of said matching logic comprises comparing said updated dropped payment file to a biller directory of billers who are set up to receive payments via said system; and wherein said comparing comprises:

carrying out an initial match to assign a score to said at least one recommended biller;

determining that said score falls into a predetermined range of values; and responsive to said determining that said score falls into said predetermined range of values, carrying out a secondary matching process;

wherein said advising said at least one of said one or more clients of said at least one recommended biller is responsive to a match during said secondary matching process.

5. The method of claim 4, wherein assigning said score comprises:

assigning an address sub-score;

assigning a name sub-score; and combining said address sub-score and said name sub-score to obtain said score.

6. A method comprising the steps of:

obtaining, by one or more computers of an electronic funds transfer bill payment system, a dropped payment file from a first client among one or more clients, said dropped payment file including data associated with at least one unsuccessful attempt to match payment data to a corresponding biller;

cleaning, by said one or more computers, said data in said dropped payment file to create an updated dropped payment file;

applying, by said one or more computers, matching logic to said updated dropped payment file to identify at least one recommended biller to which said payment data should likely have been routed to; and advising, by said one or more computers, at least one of said one or more clients of said at least one recommended biller;

wherein:

in said obtaining step, said unsuccessful attempt comprises an unsuccessful attempt to make an electronic funds transfer bill payment with said system; and in said applying step, said matching logic identifies said at least one recommended biller as a destination that said at least one unsuccessful attempt should likely have been routed to;

wherein said applying of said matching logic comprises comparing said updated dropped payment file to a biller directory of billers who are set up to receive payments via said system; and wherein said dropped payment file further includes data associated with at least a second unsuccessful attempt to match payment data to a corresponding biller, further comprising:

applying matching logic to said updated dropped payment file to attempt to identify at least another recommended biller to which said payment data associated with said at least second unsuccessful attempt should likely have been routed to;

carrying out an initial match to assign a score to said at least another recommended biller;

determining that said score falls into a predetermined range of values; and responsive to said score falling into said predetermined range of values, indicating that no match can be found for said payment data associated with said at least second unsuccessful attempt.

7. A method comprising the steps of:

obtaining, by one or more computers of an electronic funds transfer bill payment system, a dropped payment file from a first client among one or more clients, said dropped payment file including data associated with at least one unsuccessful attempt to match payment data to a corresponding biller;

cleaning, by said one or more computers, said data in said dropped payment file to create an updated dropped payment file;

applying, by said one or more computers, matching logic to said updated dropped payment file to identify at least one recommended biller to which said payment data should likely have been routed to; and advising, by said one or more computers, at least one of said one or more clients of said at least one recommended biller;

wherein:
in said obtaining step, said unsuccessful attempt comprises an unsuccessful attempt to make an electronic funds transfer bill payment with said system; and
in said applying step, said matching logic identifies said at least one recommended biller as a destination that said at least one unsuccessful attempt should likely have been routed to; and wherein said applying of said matching logic comprises:
comparing a first account number in said updated dropped payment file to an account restructuring data structure;
locating a second account number, in said account restructuring data structure, which is associated with said first account number in an account restructuring process; and
further applying said matching logic based on said second account number.

8. A method comprising the steps of:
obtaining, by one or more computers of an electronic funds transfer bill payment system, a dropped payment file from a first client among one or more clients, said dropped payment file including data associated with at least one unsuccessful attempt to match payment data to a corresponding biller;
cleaning, by said one or more computers, said data in said dropped payment file to create an updated dropped payment file;
applying, by said one or more computers, matching logic to said updated dropped payment file to identify at least one recommended biller to which said payment data should likely have been routed to; and
advising, by said one or more computers, at least one of said one or more clients of said at least one recommended biller;
wherein:
in said obtaining step, said unsuccessful attempt comprises an unsuccessful attempt to make an electronic funds transfer bill payment with said system; and
in said applying step, said matching logic identifies said at least one recommended biller as a destination that said at least one unsuccessful attempt should likely have been routed to; and
wherein said applying of said matching logic comprises categorizing a putative biller match for said at least one unsuccessful attempt into one of at least two categories to obtain categorized review information, further comprising:
making said categorized review information available to at least one human reviewer in a secure review environment; and
obtaining input from said at least one human reviewer; and
wherein said at least one recommended biller is based on said applying of said matching logic and said input from said at least one human reviewer.

9. The method of claim 8, further comprising updating a biller directory of billers who are set up to receive payments via said system, based on said input from said at least one human reviewer.

10. A method comprising the steps of:
obtaining, by one or more computers of an electronic funds transfer bill payment system, a dropped payment file from a first client among one or more clients, said dropped payment file including data associated with at least one unsuccessful attempt to match payment data to a corresponding biller;
cleaning, by said one or more computers, said data in said dropped payment file to create an updated dropped payment file;
applying, by said one or more computers, matching logic to said updated dropped payment file to identify at least one recommended biller to which said payment data should likely have been routed to; and
advising, by said one or more computers, at least one of said one or more clients of said at least one recommended biller;
wherein advising said at least one of said one or more clients of said at least one recommended biller further comprises:
providing a client output file to said at least one of said one or more clients; and
obtaining input from said at least one recommended biller about said client output file prior to providing said client output file to said at least one of said one or more clients.

11. A method comprising the steps of:
obtaining, by one or more computers of an electronic funds transfer bill payment system, a dropped payment file from a first client among one or more clients, said dropped payment file including data associated with at least one unsuccessful attempt to match payment data to a corresponding biller;
cleaning, by said one or more computers, said data in said dropped payment file to create an updated dropped payment file;
applying, by said one or more computers, matching logic to said updated dropped payment file to identify at least one recommended biller to which said payment data should likely have been routed to;
advising, by said one or more computers, at least one of said one or more clients of said at least one recommended biller; and
providing a system, wherein the system comprises distinct software modules, each of the distinct software modules being embodied on a non-transitory computer-readable storage medium, and wherein the distinct software modules comprise a data cleanup module, a matching logic module, and an output module;
wherein:
said obtaining and said cleaning are carried out by said data cleanup module executing on at least one hardware processor of said one or more computers;
said applying of said matching logic is carried out by said matching logic module executing on said at least one hardware processor of said one or more computers; and
said advising of said at least one of said one or more clients of said at least one recommended biller is carried out by said output module executing on said at least one hardware processor of said one or more computers.

12. A system comprising:
a memory;
at least one processor operatively coupled to said memory; and
a persistent storage device operatively coupled to said memory and storing in a non-transitory manner instructions which when loaded into said memory cause said at least one processor to be operative to:

obtain, by an operator of an electronic funds transfer bill payment system, from a client of such system, a dropped payment file, said dropped payment file including data associated with at least one unsuccessful attempt to match payment data to a corresponding biller;

clean said data in said dropped payment file to create an updated dropped payment file;

apply matching logic to said updated dropped payment file to identify at least one recommended biller to which said payment data should likely have been routed to; and advise said client of said at least one recommended biller;

wherein:
said unsuccessful attempt comprises an unsuccessful attempt to make an electronic funds transfer bill payment with said system; and
said matching logic identifies said at least one recommended biller as a destination that said at least one unsuccessful attempt should likely have been routed to; and wherein:
said at least one unsuccessful attempt comprises an attempt to settle a payment card account via an electronic funds transfer, and includes an account number associated with said payment card account; and
said at least one processor is operative to apply said matching logic by identifying an issuer of said payment card account from a BIN portion of said account number.

13. The system of claim 12, wherein said instructions on said persistent storage device comprise distinct software modules, and wherein said distinct software modules comprise a data cleanup module, a matching logic module, and an output module;

wherein:
said data cleanup module comprises said instructions which cause said at least one processor to obtain said dropped payment file and clean said data in said dropped payment file;
said matching logic module comprises said instructions which cause said at least one processor to apply said matching logic; and
said output module comprises said instructions which cause said at least one processor to advise said client.

14. A system comprising:
a memory;
at least one processor operatively coupled to said memory; and
a persistent storage device operatively coupled to said memory and storing in a non-transitory manner instructions which when loaded into said memory cause said at least one processor to be operative to:

obtain, by an operator of an electronic funds transfer bill payment system, from a client of such system, a dropped payment file, said dropped payment file including data associated with at least one unsuccessful attempt to match payment data to a corresponding biller;

clean said data in said dropped payment file to create an updated dropped payment file;

apply matching logic to said updated dropped payment file to identify at least one recommended biller to which said payment data should likely have been routed to; and advise said client of said at least one recommended biller;

wherein:
said unsuccessful attempt comprises an unsuccessful attempt to make an electronic funds transfer bill payment with said system; and
said matching logic identifies said at least one recommended biller as a destination that said at least one unsuccessful attempt should likely have been routed to; and wherein said at least one processor is operative to apply said matching logic by:
comparing a first account number in said updated dropped payment file to an account restructuring data structure;
locating a second account number, in said account restructuring data structure, which is associated with said first account number in an account restructuring process; and
further applying said matching logic based on said second account number.

15. The system of claim 14, wherein said instructions on said persistent storage device comprise distinct software modules, and wherein said distinct software modules comprise a data cleanup module, a matching logic module, and an output module;

wherein:
said data cleanup module comprises said instructions which cause said at least one processor to obtain said dropped payment file and clean said data in said dropped payment file;
said matching logic module comprises said instructions which cause said at least one processor to apply said matching logic; and
said output module comprises said instructions which cause said at least one processor to advise said client.

16. A system comprising:
a memory;
at least one processor operatively coupled to said memory; and
a persistent storage device operatively coupled to said memory and storing in a non-transitory manner instructions which when loaded into said memory cause said at least one processor to be operative to:

obtain, by an operator of an electronic funds transfer bill payment system, from a client of such system, a dropped payment file, said dropped payment file including data associated with at least one unsuccessful attempt to match payment data to a corresponding biller;

clean said data in said dropped payment file to create an updated dropped payment file;

apply matching logic to said updated dropped payment file to identify at least one recommended biller to which said payment data should likely have been routed to; and advise said client of said at least one recommended biller;

wherein:
said unsuccessful attempt comprises an unsuccessful attempt to make an electronic funds transfer bill payment with said system; and
said matching logic identifies said at least one recommended biller as a destination that said at least one unsuccessful attempt should likely have been routed to; and wherein said at least one processor is operative to apply said matching logic by categorizing a putative biller match for said at least one unsuccessful attempt into one of at least two categories to obtain categorized review information, and wherein said at least one processor is further operative to:

make said categorized review information available to at least one human reviewer in a secure review environment; and obtain input from said at least one human reviewer; and wherein said at least one recommended biller is based on said applying of said matching logic and said input from said at least one human reviewer.

17. The system of claim 16, wherein said instructions on said persistent storage device comprise distinct software modules, and wherein said distinct software modules comprise a data cleanup module, a matching logic module, and an output module;

wherein:

said data cleanup module comprises said instructions which cause said at least one processor to obtain said dropped payment file and clean said data in said dropped payment file;

said matching logic module comprises said instructions which cause said at least one processor to apply said matching logic; and said output module comprises said instructions which cause said at least one processor to advise said client.

* * * * *